United States Patent
Zang et al.

(10) Patent No.: US 12,007,784 B2
(45) Date of Patent: Jun. 11, 2024

(54) METHOD AND APPARATUS FOR SELF LOCALIZATION

(71) Applicant: HERE Global B.V., Eindhoven (NL)

(72) Inventors: Andi Zang, Evanston, IL (US); Xin Chen, Glencoe, IL (US)

(73) Assignee: HERE GLOBAL B.V., Eindhoven (NL)

( * ) Notice: Subject to any disclaimer, the term of this patent is extended or adjusted under 35 U.S.C. 154(b) by 312 days.

(21) Appl. No.: 16/830,772

(22) Filed: Mar. 26, 2020

(65) Prior Publication Data
US 2021/0302993 A1 Sep. 30, 2021

(51) Int. Cl.
*G05D 1/00* (2006.01)
*H04W 4/029* (2018.01)

(52) U.S. Cl.
CPC ........... *G05D 1/0268* (2013.01); *G05D 1/024* (2013.01); *G05D 1/0248* (2013.01); *G05D 1/0278* (2013.01); *H04W 4/029* (2018.02)

(58) Field of Classification Search
CPC .. G05D 1/0268; G05D 1/0278; G05D 1/0248; G05D 1/024; H04W 4/029
See application file for complete search history.

(56) References Cited

U.S. PATENT DOCUMENTS

| | | |
|---|---|---|
| 8,433,661 B2 | 4/2013 | Eggert et al. |
| 8,447,519 B2 | 5/2013 | Basnayake et al. |
| 2006/0220912 A1* | 10/2006 | Heenan ................ G05D 1/0248 340/933 |
| 2018/0003511 A1* | 1/2018 | Browning .......... G01C 21/3848 |
| 2018/0024562 A1* | 1/2018 | Bellaiche .................. G06T 7/73 701/26 |
| 2018/0045519 A1 | 2/2018 | Ghadiok et al. |
| 2018/0075311 A1 | 3/2018 | Weimer et al. |
| 2018/0087907 A1* | 3/2018 | DeBitetto ............... G01S 19/48 |
| 2019/0026918 A1 | 1/2019 | Gomezcaballero et al. |
| 2019/0042863 A1 | 2/2019 | Kasuga |
| 2019/0316929 A1* | 10/2019 | Shin ..................... G05D 1/0246 |

OTHER PUBLICATIONS

Abbott, E. et al., *Land-Vehicle Navigation Using GPS*, Proceedings of the IEEE, vol. 87, No. 1 (Jan. 1999) pp. 145-162.
Bar-Shalom, Y. et al., *Estimation With Applications to Tracking and Navigation*, John Wiley & Sons, Inc. (2001) 526 pages.

(Continued)

*Primary Examiner* — James J Yang
(74) *Attorney, Agent, or Firm* — ALSTON & BIRD LLP

(57) ABSTRACT

Methods described herein relate to self-localization. Methods may include: receiving sensor data from a vehicle traveling along a road segment; identifying one or more objects of the environment from the sensor data; determining a coarse location of the vehicle; comparing the identified one or more objects with corresponding ground truth objects; calculating an observation in response to the comparison of the identified one or more objects with the corresponding ground truth objects; determining a location of the vehicle with a higher precision than the coarse location based, at least in part, on the observation; and allocating resources of the apparatus based, at least in part, on the observation.

20 Claims, 10 Drawing Sheets

(56) References Cited

OTHER PUBLICATIONS

Barsan, I. A. et al., *Learning to Localize Using a LiDAR Intensity Map*, 2nd Conference on Robot Learning (2018) 13 pages.
Blanco, J. L. et al., *A Collection of Outdoor Robotic Datasets With Centimeter-Accuracy Ground Truth*, Autonomous Robots (Nov. 2009) 27 pages.
Blanco-Claraco, J-L. et al., *The Málaga Urban Dataset: High-Rate Stereo and LiDAR In a Realistic Urban Scenario*, The International Journal of Robotics Research 2014 (vol. 33(2) (2013) 207-214.
Bonarini, A. et al., *RAWSEEDS: Robotics Advancement Through Web-Publishing of Sensorial and Elaborated Extensive Data Sets*, In Proceedings of IROS, vol. 6 (2006), 5 pages.
Brenner, C., *Extraction of Features from Mobile Laser Scanning Data for Future Driver Assistance Systems*, Advances in GIScience, Springer (2009), 25-42 (2009).
Brenner, C., *Global Localization of Vehicles Using Local Pole Patterns*, Joint Pattern Recognition Symposium, Springer (2009) 61-70.
Brenner, C., *Vehicle Localization Using Landmarks Obtained by a LiDAR Mobile Mapping System*, IAPRS, vol. XXXVIII, Part 3A (2010) 139-144.
Bresson, G. et al., *Simultaneous Localization and Mapping: A Survey of Current Trends in Autonomous Driving*, IEEE Transactions on Intelligent Vehicles, Institute of Electrical and Electronics Engineers (2017) 29 pages.
Burgard, W. et al., *A Comparison of SLAM Algorithms Based on a Graph of Relations*, IEEE/RSJ Int. Conf. on Intelligent Robots and Systems (2009) 9 pages.
Burgard, W. et al., *Trajectory-Based Comparison of SLAM Algorithms*, Proc. of IEEE/RSJ Int. Conf. on Intelligent Robots & Systems (2009) 8 pages.
Cabo, C. et al., *An Algorithm for Automatic Detection of Pole-Like Street Furniture Objects From Mobile Laser Scanner Point Clouds*, ISPRS Journal of Photogrammetry and Remote Sensing 87 (2014) 47-56.
Carlevaris-Bianco, N. et al., *University of Michigan North Campus Long-Term Vision and Lidar Dataset*, The International Journal of Robotics Research (2010) 1-16.
Ceriani, S. et al., *Rawseeds Ground Truth Collection Systems for Indoor Self-Localization and Mapping*, Auton Robot (2009).
Cordts, M. et al., *The Cityscapes Dataset for Semantic Urban Scene Understanding*, arXiv:1604.01685 (2016) 30 pages.
Fontana, G. et al., *Rawseeds. Building a Benchmarking Toolkit for Autonomous Robotics*, Methods and Experimental Techniques in Computer Engineering, Springer (2014) 55-68.
Geiger, A. et al., *Vision Meets Robotics: The KITTI Dataset*, The International Journal of Robotics Research 32(11) (2013) 1231-1237.
Geiger, A. et al., *Are We Ready for Autonomous Driving? The KITTI Vision Benchmark Suite*, 2012 IEEE Conference on Computer Vision and Pattern Recognition (2012) 3354-3361, 8 pages.
Ghallabi, F. et al., *LIDAR-Based Lane Marking Detection for Vehicle Positioning in an HD Map*, 2018 IEEE 21st International Conference on Intelligent Transportation Systems (ITSC) (Nov. 2018) 7 pages.
Godha, S., *Performance Evaluation of Low Cost MEMS-Based IMU Integrated With GPS for Land Vehicle Navigation Application*, Thesis, UCGE Reports No. 20239, Geomatic Engineering (Feb. 2006) 230 pages.
Grisetti, G. et al., *A Tutorial on Graph-Based SLAM*, IEEE Intelligent Transportation Systems Magazine 2(4) (2010) 31-43, 11 pages.
Hata, A. et al., *Road Marking Detection Using LIDAR Reflective Intensity Data and Its Application to Vehicle Localization*, 2014 IEEE 17th International Conference on Intelligent Transportation Systems (ITSC) (Oct. 2014) 584-589.
Hata, A. Y. et al., *Robust Curb Detection and Vehicle Localization in Urban Environments*, 2014 IEEE Intelligent Vehicles Symposium Proceedings (2014) 1257-1262, 6 pages.
Hata, A. et al., *Feature Detection for Vehicle Localization in Urban Environments Using a Multilayer LIDAR*, Journal of Latex Case Files, vol. 11, No. 4 (Dec. 2012) 10 pages.
Hofmann, S. et al., *Quality Assessment of Automatically Generated Feature Maps for Future Driver Assistance Systems*, ACM GIS'09 (Nov. 2009) 4 pages.
Huang, A. S. et al., *A High-Rate, Heterogeneous Data Set From The DARPA Urban Challenge*, The International Journal of Robotics Research 29.13 (2010) 1595-1601, 6 pages.
Im, J-H. et al., *Vertical Corner Feature Based Precise Vehicle Localization Using 3D LIDAR In Urban Area*, Sensors 16, 1268 (2016) 23 pages.
Inam, W., *Particle Filter Based Self-Localization Using Visual Landmarks and Image Database*, 2009 IEEE International Symposium on Computational Intelligence in Robotics and Automation (CIRA) (2009) 246-251, 6 pages.
Jeong, J. et al., *Road-SLAM: Road Marking Based SLAM With Lane-Level Accuracy*, 2017 IEEE Intelligent Vehicles Symposium (IV) (2017) 1736-1473, 8 pages.
Kummerle, R. et al., On Measuring the Accuracy of SLAM Algorithms, Autonomous Robots (27) 4 (2009) 387-407, 28 pages.
Lee, B-H. et al., *GPS/DR Error Estimation for Autonomous Vehicle Localization*, Sensors 15 (2015) 20779-20798.
Lehtomäki, M. et al., *Detection of Vertical Pole-Like Objects in a Road Environment Using Vehicle-Based Laser Scanning Data*, Remote Sens. 2 (2010) 641-664.
Levinson, J. et al., *Traffic light Mapping, Localization, and State Detection for Autonomous Vehicles*, 2011 IEEE International Conference on Robotics and Automation (2011) 5784-5791, 8 pages.
Li, B. et al., *Vehicle Detection From 3D Lidar Using Fully Convolutional Network*, arXiv:1608.07916v1 (Aug. 29, 2016) 8 pages.
Li, L. et al., *Precise and Reliable Localization of Intelligent Vehicles for Safe Driving*, International Conference on Intelligent Autonomous Systems (Springer) (2016) 55-68, 12 pages.
Li, X. R. et al., *Practical Measures and Test for Credibility of an Estimator*, Proc. Workshop on Estimation, Tracking, and Fusion—A Tribute to Yaakov Bar-Shalom (2001) 481-495, 15 pages.
Liu, H. et al., *A Precise and Robust Segmentation-Based Lidar Localization System for Automated Urban Driving*, Remote Sensing 11 (2009) 18 pages.
Lu, F. et al., *Globally Consistent Range Scan Alignment for Environment Mapping*, Autonomous Robots 4 (1997) 333-349.
Mageid, S. A., *Self-Correcting Localization Scheme for Vehicle to Vehicle Communication*, International Journal of Computer Networks and Applications (IJCNA), vol. 3, Issue 5 (Sep.-Oct. 2016) 95-107.
Mendes, E. et al., *ICP-Based Pose-Graph SLAM*, International Symposium on Safety, Security and Rescue Robotics (SSRR) (Oct. 2016) 195-200.
Menon, A. et al., *Roadside Range Sensors for Intersection Decision Support, Proceedings*, 7th International IEEE Conference on Intelligent Transportation Systems (IEEE Cat. No. 04TH8749) (2004) 210-215, 6 pages.
Modsching, M. et al., *Field Trial on GPS Accuracy In a Medium Size City: The Influence of Built-Up*, Proceedings of the 3rd Workshop on Positioning, Navigation and Communication (WPNC '06) (2006) 209-218.
Monnier, F. et al., *Trees Detection From Laser Point Clouds Acquired in Dense Urban Areas by a Mobile Mapping System*, ISPRS Annals of the Photogrammetry, Remote Sensing and Spatial Information Sciences, vol. 1-3 (2012) 245-250.
Morrell, J. J., *Estimated Service Life of Wood Utility Poles*, North American Wood Pole Council, Technical Bulletin No. 16-U-101, (Feb. 2016) 8 pages.
Nardi, L. et al., *Introducing SLAMBench, a Performance and Accuracy Benchmarking Methodology for SLAM*, IEEE Intl. Conf. on Robotics and Automation (ICRA 2015) 5783-5790, 9 pages.
Obst, M. et al., *Car-to-Car Communication for Accurate Vehicle Localization—The CoVeL Approach*, International Multi-Conference on Systems, Signals & Devices, IEEE (2012) 1-6.
Olsen, M. J. et al., *Lidar For Maintenance of Pavement Reflective Markings and Retroreflective Signs*, vol. 1: Reflective Pavement Markings, Final Report, Project SPR 799 (Aug. 2018) 199 pages.

(56) References Cited

OTHER PUBLICATIONS

Pandey, G. et al., *Ford Campus Vision and Lidar Data Set*, The International Journal of Robotics Research 30(13) (21011) 1543-1552.

Peker, A. U. et al., *Particle Filter Vehicle Localization and Map-Matching Using Map Topology*, 2011 IEEE Intelligent Vehicles Symposium (IV) (Jun. 2011) 248-253.

Peynot, T. et al., *The Marulan Data Sets: Multi-Sensor Perception in a Natural Environment With Challenging Conditions*, The International journal of Robotics Research 29(13) (2010) 1602-1607.

Qu, X. et al., *Vehicle Localization Using Mono-Camera and Geo-Referenced Traffic Signs*, 2015 IEE Intelligent Vehicles Symposium (IV) (2015) 605-610, 6 pages.

Rehder, E. et al., *Submap-Based SLAM for Road Markings*, 2015 IEEE Intelligent Vehicles Symposium (IV) (2015) 1393-1398, 6 pages.

Renfro, B. A. et al., *An Analysis of Global Positioning System (GPS) Standard Positioning System (SPS) Performance for 2014*, TR-SGL-17-02 (Mar. 2017) 105 pages.

Renfro, B. A. et al., *An Analysis of Global Positioning System (GPS) Standard Positioning System (SPS) Performance for 2015*, TR-SGL-17-04 (Mar. 2017) 105 pages.

Renfro, B. A. et al., *An Analysis of Global Positioning System (GPS) Standard Positioning Service (SPS) Performance for 2016*, TR-SGL-17-06 (May 2017) 97 pages.

Renfro, B. A. et al., *An Analysis of Global Positioning System (GPS) Standard Positioning Service (SPS) Performance for 2017*, TR-SGL-18-02 (Mar. 2018) 96 pages.

Renfro, B. A. et al., *An Analysis of Global Positioning System (GPS) Standard Positioning Service (SPS) Performance for 2018*, TR-SGL-19-02 (Mar. 2019) 110 pages.

Sattler, T. et al., *Benchmarking 6DOF Outdoor Visual Localization in Changing Conditions*, Proceedings of the IEEE Conference on Computer Vision and Pattern Recognition (2018) 8601-8610.

Schaefer, A. et al., *Long-Term Urban Vehicle Localization Using Pole Landmarks Extracted From 3-D Lidar Scans*, IEEE (2019) 8 pages.

Schindler, A., *Vehicle Self-Localization Using High-Precision Digital Maps*, Dissertation, Universitat Passau (Feb. 2013) 156 pages.

Schlichting, A. et al., *Localization Using Automotive Laser Scanners and Local Pattern Matching*, 2014 IEEE Intelligent Vehicles Symposium (IV) (Jun. 2014) 414-419.

Schlichting, A. et al. *Vehicle Localization by Lidar Point Correlation Improved by Change Detection*, The International Archives of the Photogrammetry, Remote Sensing and Spatial Information Sciences, vol. XLI-B1 (2016) 703-710.

Schönberger, J. L. et al., *Semantic Visual Localization*, arXiv:1712.05773v2 (Apr. 16, 2018) 21 pages.

Schreiber, M. et al., *LaneLoc: Lane Marking Based Localization Using Highly Accurate Maps*, 2013 IEEE Intelligent Vehicles Symposium (IV) (Jun. 2013) 449-454.

Sefati, M. et al., *Improving Vehicle Localization Using Semantic and Pole-Like Landmarks*, 2017 IEEE Intelligent Vehicles Symposium (IV) (2017) 13-19.

Sinha, K. C. et al. *On the Concept of Total Highway Management*, Transportation Research Record 1229 (1989) 79-88.

Smith, M. et al., *The New College Vision and Laser Data Set*, The International Journal of Robotics Research, vol. 28, No. 5 (May 2009) 595-599.

Spangenberg, R. et al., *Pole-Based Localization for Autonomous Vehicles in Urban Scenarios*, 2016 IEEE/RSJ International Conference on Intelligent Robots and Systems (IROS) (2016) 2161-2166, 6 pages.

Stenborg, E., *Localization for Autonomous Vehicles*, Thesis, Chalmers University of Technology (2017) 55 pages.

Sturm, J. et al., *A Benchmark for the Evaluation of RGB-D SLAM Systems*, 2012 IEEE/RSJ International Conference on Intelligent Robots and Systems (2012) 573-580, 8 pages.

Suhr, J. K. et al., *Sensor Fusion-Based Low-Cost Vehicle Localization System for Complex Urban Environments*, IEEE Transactions on Intelligent Transportation Systems (2016) 9 pages.

Thompson, P. D. et al., *Estimating Life Expectancies of Highway Assets*, vol. 1: Guidebook, NCHRP Report 713 (2012) 150 pages.

Voelcker, J., *Autonomous Vehicles Complete DARPA Urban Challenge—IEEE Spectrum* [online] Retrieved via the Internet: https://spectrum.ieee.org/transportation/advanced-cars/autonomous-vehic . . . (dated Nov. 1, 2007) 2 pages.

Weiss, T. et al., *Precise Ego-Localization In Urban Areas Using Laserscanner and High Accuracy Feature Maps*, IEEE (2005) 284-289.

Welzel, A. et al., *Improving Urban Vehicle Localization With Traffic Sign Recognition*, 2015 IEEE 18$^{th}$ International Conference on Intelligent Transportation Systems (2015) 2728-2732.

Weng, L. et al., *Pole-Based Real-Time Localization for Autonomous Driving in Congested Urban Scenarios*, 2018 IEEE International Conference on Real-Time Computing and Robotics (RCAR) (2018) 96-101.

Wilbers, D. et al., *A Comparison of Particle Filter and Graph-Based Optimization for Localization With Landmarks In Automated Vehicles*, 2019 Third IEEE International Conference on Robotic Computing (IRC) (2019) 220-225, 8 pages.

Wolcott, R. W. et al., *Visual Localization Within LIDAR Maps for Automated Urban Driving*, 2014 IEEE/RSJ International Conference on Intelligent Robots and Systems (2014) 176-183, 8 pages.

Xie, J. et al., *A Real-Time Robust Global Localization for Autonomous Mobile Robots in Large Environments*, International Conference on Control, Automation, Robotics and Vision (2010).

Yan, W. Y. et al. *Automatic Extraction of Highway Light Poles and Towers From Mobile LiDAR Data*, Optics & Laser Technology (Sep. 12, 2015) 14 pages.

Yang, B. et al., *PIXOR: Real-Time 3D Object Detection From Point Clouds*, Proceedings of the IEEE Conference on Computer Vision and Pattern Recognition (2018) 7652-7660.

Zang, A. et al., *Accurate Vehicle Self-Localization in High Definition Map Dataset*, Proceedings of the 1$^{st}$ ACM SIGSPATIAL Workshop on High-Precision Maps and Intelligent Applications for Autonomous Vehicles, ACM (2017) 8 pages.

*Pavement Markings on Challenging Surfaces*, Department of Transportation (Jun. 2017) 2 pages.

GPS.gov: Augmentation Systems [online] [retrieved Jul. 24, 2020]. Retrieved via the Internet: https://www.gps.gov/systems/augmentations/ (dated Mar. 22, 2018) 2 pages.

Extended European Search Report for European Application No. 21165212.8 dated Sep. 21, 2021, 8 pages.

\* cited by examiner

| Object Type | Physical Properties | | | | Time Cost | | Reliability | | Size in database |
|---|---|---|---|---|---|---|---|---|---|
| | Density | Lifespan | Distinction | Localization information | Processing | Matching | Weather | Random object | |
| Poles | dense/fair | long | fair | lat+lon | fair to long | short | strong | strong | small |
| Lane Markings | continuous | short | low | lat | short to long | short | weak | strong | small |
| Curbs/ Guardrails | continuous | long | low | lat | fair to long | short | weak/ strong | strong | small |
| Signs | spares | fair | high | lat+lon/lon | fair to long | short | strong | strong | small |
| Corners and Surfaces | dense/rare | long | low | lat+lon | fair | short | strong | weak | |
| "Content" Objects | continuous | — | — | lat+lon | short | long | strong | weak | large |

Figure 3

METHOD AND APPARATUS FOR SELF LOCALIZATION

TECHNOLOGICAL FIELD

Example embodiments of the present invention relate generally to localization of an apparatus within a mapped region, and more particularly, to improving the efficiency of localization through a reduction in the search space explored to establish an accurate location more effectively.

BACKGROUND

Road geometry modelling and object modelling is useful for map creation and identification of objects of interest in environments, such as road signs, poles, or lane lines along a road segment. Such object identification may facilitate autonomous vehicle navigation along a prescribed path and/or visual self-localization of a vehicle traveling along a road segment based on scene or environment identification. Traditional methods for modelling of road geometry and environment or feature detection are resource intensive, often requiring significant amounts of human measurement and calculation. Such methods are thus time consuming and costly. Exacerbating this issue is the fact that many modern-day applications require the analysis of large amounts of data, and therefore are not practical without quicker or less costly techniques.

Vision based map localization relies upon the identification of a location based on recognition of the environment, such as through identification of detected features in a modelled road geometry. Vision based map localization includes a map or model represented as a collection of geo-referenced images or objects that are amenable to visual place recognition. In the case of environments that do not have satellite-based navigation availability, or where accuracy from satellite-based navigation methods may be lower than necessary for autonomous vehicle control, a localization technique is needed to position an object, such as a vehicle, within the environment. However, such localization can be inefficient. Latency in localization is problematic for autonomous vehicle control which may require accurate localization in a timely fashion to capitalize on information stored in high definition (HD) maps for use in assisting autonomous and semi-autonomous vehicle control.

BRIEF SUMMARY

Accordingly, a method, apparatus, and computer program product are provided for localization of an apparatus within a mapped region, and more particularly, for improving the efficiency of localization through a reduction in the search space explored to establish an accurate location more effectively. Embodiments described herein may provide an apparatus including at least one processor and at least one non-transitory memory including computer program code instructions with the computer program code instructions configured to, when executed, cause the apparatus to at least: receive sensor data from a vehicle traveling along a road segment; determine a coarse location of the vehicle; identify one or more objects of the environment from the sensor data; compare the identified one or more objects with corresponding ground truth objects; calculate an observation in response to the comparison of the identified one or more objects with the corresponding ground truth objects; determine a location of the vehicle with a higher precision than the coarse location based, at least in part, on the observation; and allocate resources of the apparatus based, at least in part, on the observation.

According to an example embodiment, causing the apparatus to identify one or more objects of the environment from the sensor data includes causing the apparatus to: using a first algorithm of a first module, identify one or more pole objects in the environment from the sensor data; and using a second algorithm of a second module, identify one or more lane line objects in the environment from the sensor data. Causing the apparatus of some embodiments to compare the identified one or more objects with corresponding ground truth objects may include causing the apparatus to: compare the identified one or more pole objects in the environment with corresponding ground truth pole objects; and compare the identified one or more lane line objects in the environment with corresponding ground truth lane line objects.

According to some embodiments, causing the apparatus to calculate an observation in response to the comparison of the identified one or more objects with the corresponding ground truth object may include causing the apparatus to: calculate a first observation in response to the comparison of the identified one or more pole objects in the environment with the corresponding ground truth pole objects; and calculate a second observation in response to the comparison of the identified one or more lane line objects in the environment with corresponding ground truth lane line objects. Causing the apparatus of some embodiments to allocate resources of the apparatus based, at least in part, on the observation may include causing the apparatus to: analyze resource consumption of the first module and the second module; and allocate proportionally more resources to at least one of the first module or the second module in response to the analysis.

Causing the apparatus of some embodiments to allocate resources of the apparatus based, at least in part, on the observation may include causing the apparatus to: identify a model based, at least in part, on the calculated first observation and the calculated second observation; and allocate resources according to the identified model. The apparatus may be caused to receive sensor data from at least one of a global positioning system (GPS) or inertial measurement unit (IMU), and identify, at a third module, the coarse location based on the sensor data from the at least one of the GPS or IMU. Causing the apparatus to allocate resources of the apparatus based, at least in part, on the observation may include causing the apparatus to allocate proportionally more resources to the first module, the second module, or the third module based, at least in part, on the observation and the coarse location identified at the third module. The sensor data may include at least one of Light Distancing and Ranging (LiDAR) data from an environment of the vehicle. Causing the apparatus to compare the identified one or more objects with corresponding ground truth objects may include causing the apparatus to compare, using a nearest-neighbors approach, the identified one or more objects of the environment with the ground truth objects.

Embodiments provided herein may include a computer program product including at least one non-transitory computer-readable storage medium having computer-executable program code instructions stored therein with the computer-executable program code instructions include program code instructions to: receive sensor data from a vehicle traveling along a road segment; determine a coarse location for the vehicle; identify one or more objects of the environment from the sensor data; compare the identified one or more objects with corresponding ground truth objects; calculate an observation in response to the comparison of the identified one or more objects with the corresponding ground truth objects; determine a location of the vehicle with a higher precision than the coarse location based, at least in part, on the observation; and allocate resources of the apparatus based, at least in part, on the observation.

The program code instructions to identify one or more objects of the environment from the sensor data may include program code instructions to: using a first algorithm of a first module, identify one or more pole objects in the environment from the sensor data; and using a second algorithm of a second module, identify one or more lane line objects in the environment from the sensor data. The program code instructions to compare the identified one or more objects with corresponding ground truth objects may include program code instructions to: compare the identified one or more pole objects in the environment with corresponding ground truth pole objects; and compare the identified one or more lane line objects in the environment with corresponding ground truth lane line objects.

The program code instructions to calculate an observation in response to the comparison of the identified one or more objects with the corresponding ground truth objects may include program code instructions to: calculate a first observation in response to the comparison of the identified one or more pole objects in the environment with the corresponding ground truth pole objects; and calculate a second observation in response to the comparison of the identified one or more lane line objects in the environment with corresponding ground truth lane line objects. The program code instructions to allocate resources of the apparatus based, at least in part, on the observation may include program code instructions to: analyze resource consumption of the first module and the second module; and allocate proportionally more resources to at least one of the first module or the second module in response to the analysis of resource consumption.

The program code instructions to allocate resources of the apparatus based, at least in part, on the observation may include program code instructions to: identify a model based, at least in part, on the calculated first observation and the calculated second observation; and allocate resources according to the model. Embodiments may include program code instructions to: receive sensor data from at least one of a global positioning system (GPS) or inertial measurement unit (IMU); and identify, at a third module, the coarse location based on the sensor data from the at least one of the GPS or IMU. The program code instructions to allocate resources of the apparatus based, at least in part, on the observation may include program code instructions to allocate proportionally more resources to the first module, the second module, or the third module based, at least in part, on the observation and the coarse location identified at the third module. The sensor data may include at least one of Light Detection and Ranging (LiDAR) data from an environment of the vehicle, where the program code instructions to compare the identified one or more objects with corresponding ground truth objects may include program code instructions to compare, using a nearest-neighbors approach, the identified one or more objects of the environment with the ground truth objects.

Embodiments provided herein may include a method for self-localization including: receiving sensor data from a vehicle traveling along a road segment; identifying one or more objects of the environment from the sensor data; determining a coarse location of the vehicle; comparing the identified one or more objects with corresponding ground truth objects; calculating an observation in response to the comparison of the identified one or more objects with the corresponding ground truth objects; determining a location of the vehicle with a higher precision than the coarse location based, at least in part, on the observation; and allocating resources of the apparatus based, at least in part, on the observation. Identifying one or more objects of the environment from the sensor data may include: using a first algorithm of a first module, identifying one or more pole objects in the environment from the sensor data; and using a second algorithm of a second module, identifying one or more lane line objects in the environment from the sensor data.

According to some embodiments, comparing the identified one or more objects with corresponding ground truth objects may include: comparing the identified one or more pole objects in the environment with corresponding ground truth pole objects; and comparing the identified one or more lane line objects in the environment with corresponding ground truth lane line objects. Calculating an observation in response to the comparison of the identified one or more objects with the corresponding ground truth objects includes: calculating a first observation in response to the comparison of the identified one or more pole objects in the environment with the corresponding ground truth pole objects; and calculating a second observation in response to the comparison of the identified one or more lane line objects in the environment with corresponding ground truth lane line objects.

Embodiments provided herein may include an apparatus for self-localization including: means for receiving sensor data from a vehicle traveling along a road segment; means for identifying one or more objects of the environment from the sensor data; means for determining a coarse location of the vehicle; means for comparing the identified one or more objects with corresponding ground truth objects; means for calculating an observation in response to the comparison of the identified one or more objects with the corresponding ground truth objects; means for determining a location of the vehicle with a higher precision than the coarse location based, at least in part, on the observation; and means for allocating resources of the apparatus based, at least in part, on the observation. The means for identifying one or more objects of the environment from the sensor data may include: means for identifying one or more pole objects in the environment from the sensor data using a first algorithm of a first module; and means for identifying one or more lane line objects in the environment from the sensor data using a second algorithm of a second module.

According to some embodiments, the means for comparing the identified one or more objects with corresponding ground truth objects may include: means for comparing the identified one or more pole objects in the environment with corresponding ground truth pole objects; and means for comparing the identified one or more lane line objects in the environment with corresponding ground truth lane line objects. The means for calculating an observation in response to the comparison of the identified one or more objects with the corresponding ground truth objects may include: means for calculating a first observation in response to the comparison of the identified one or more pole objects in the environment with the corresponding ground truth pole objects; and means for calculating a second observation in response to the comparison of the identified one or more lane line objects in the environment with corresponding ground truth lane line objects.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
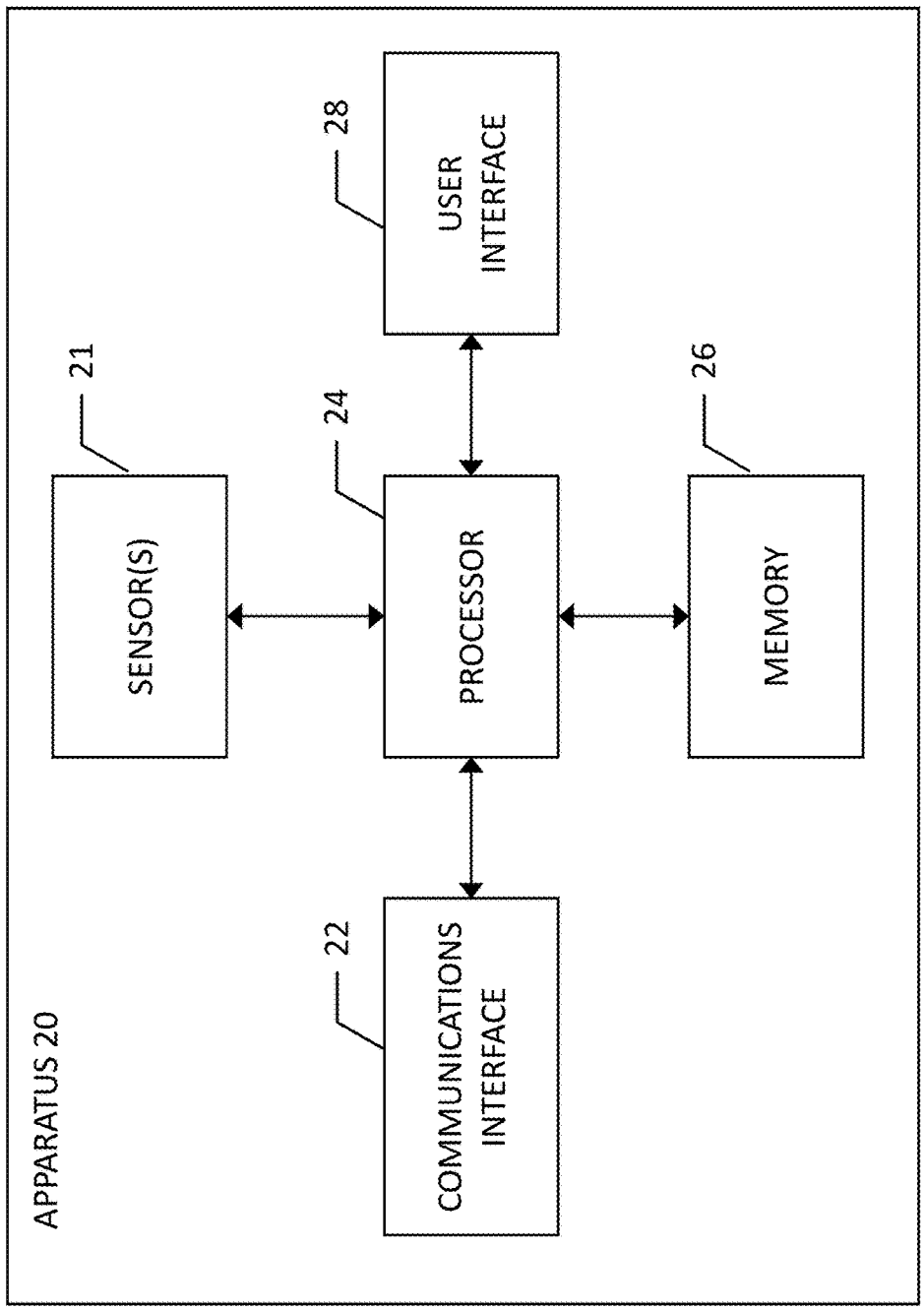
Figure 2:
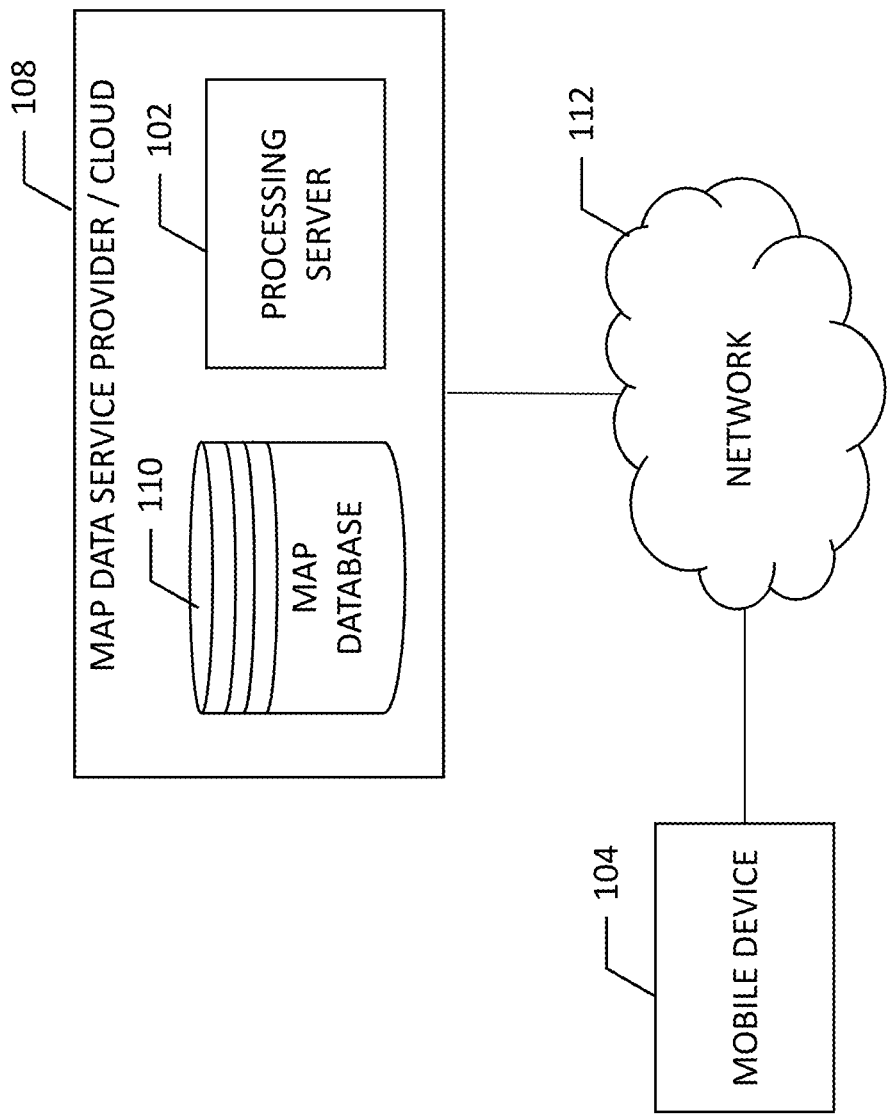
Figure 4:
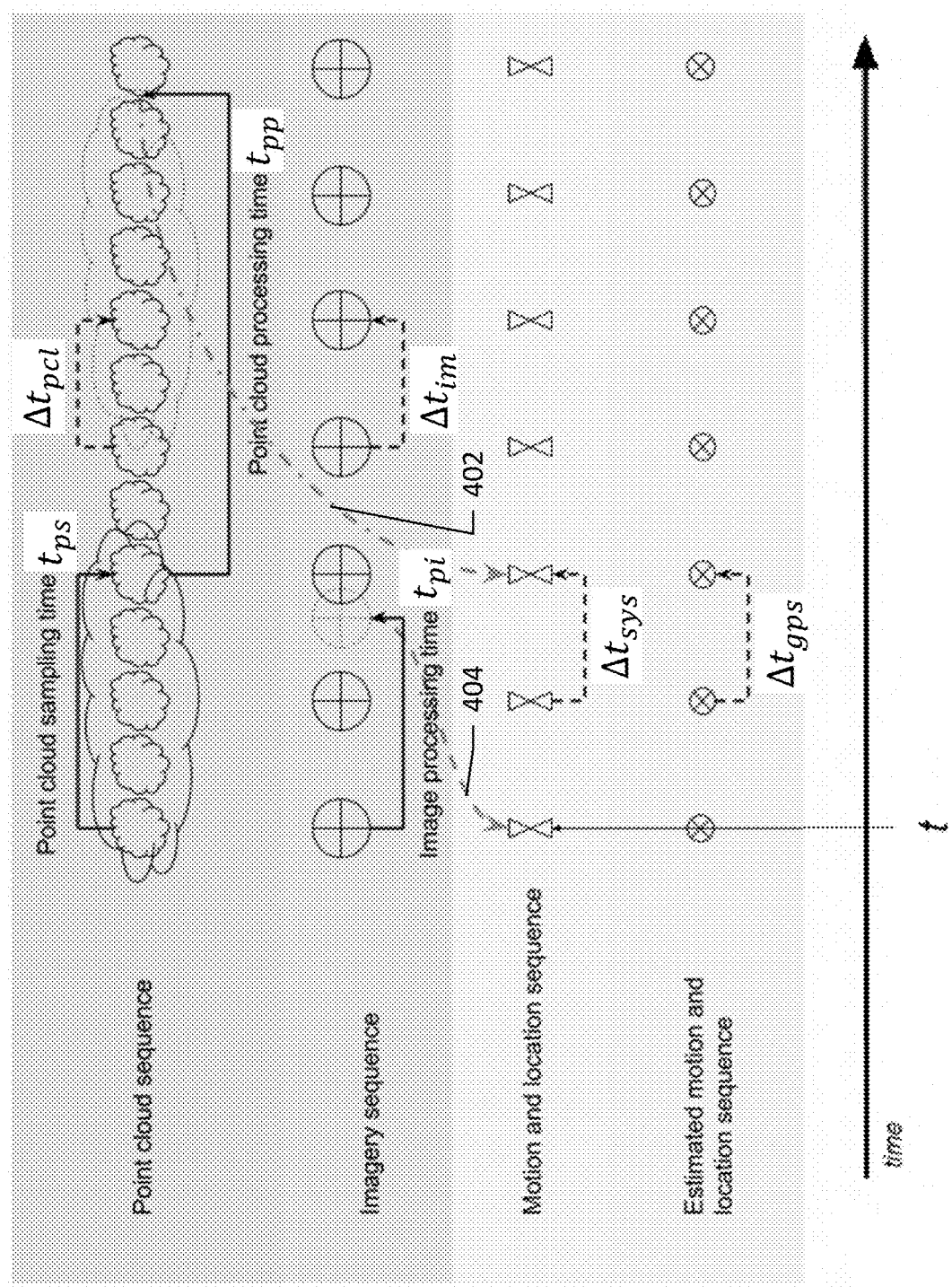
Figure 5:
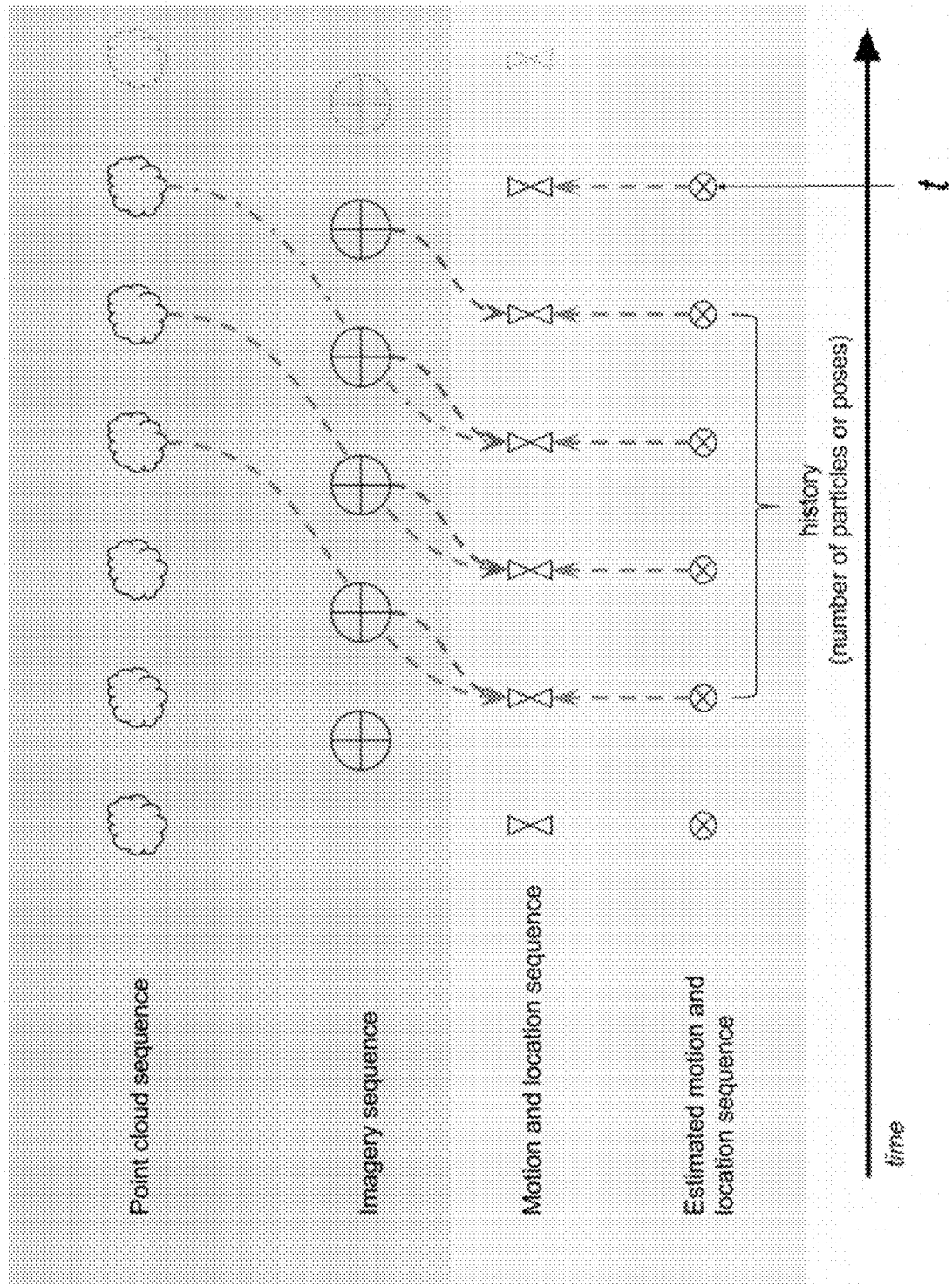
Figure 6:
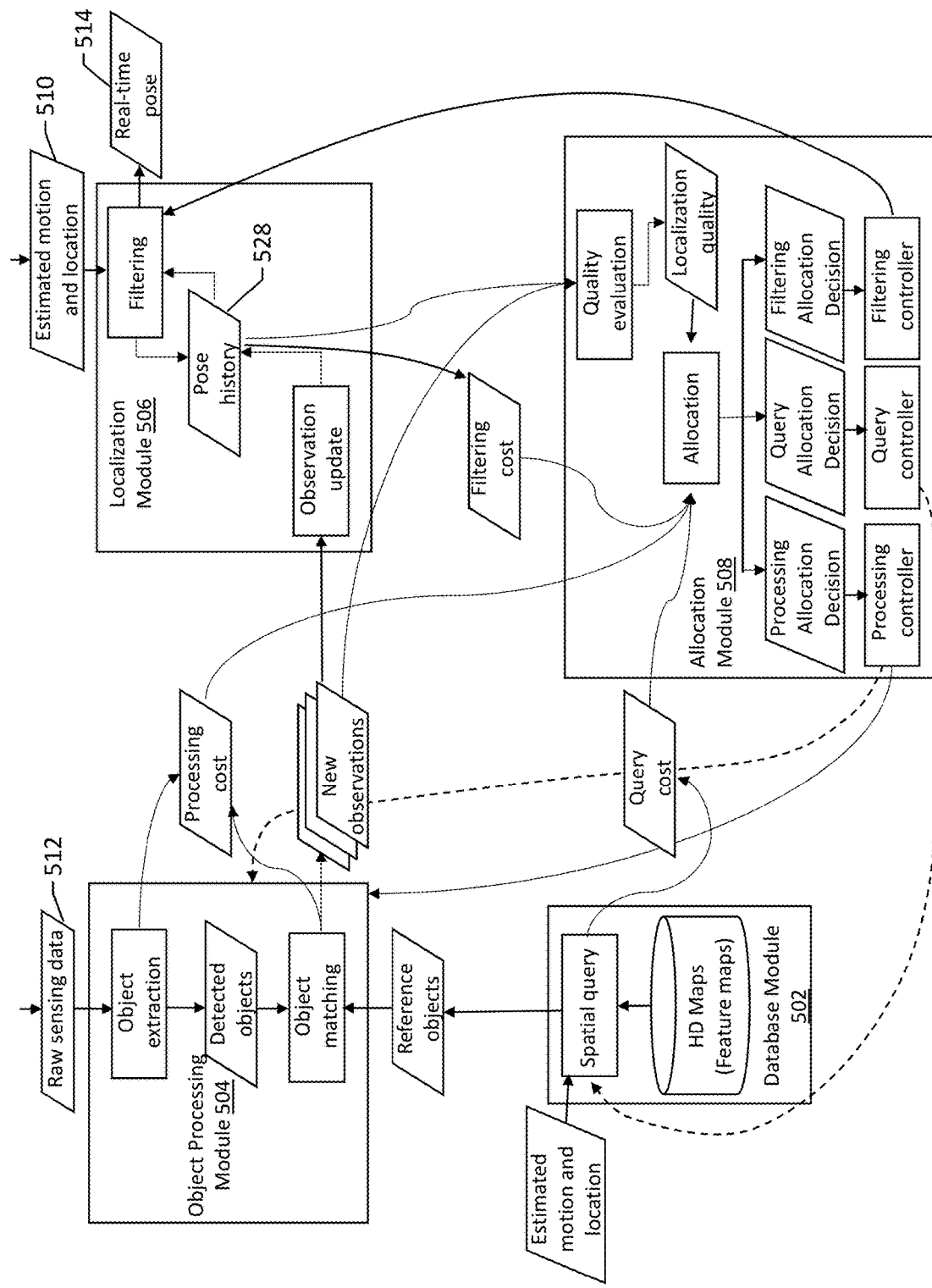
Figure 7:
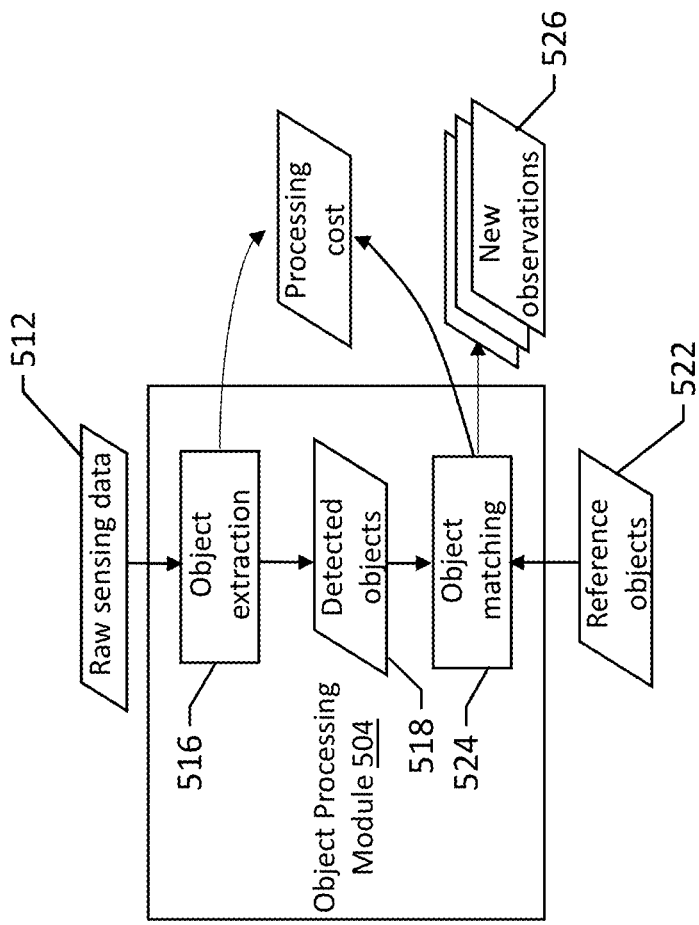
Figure 8:
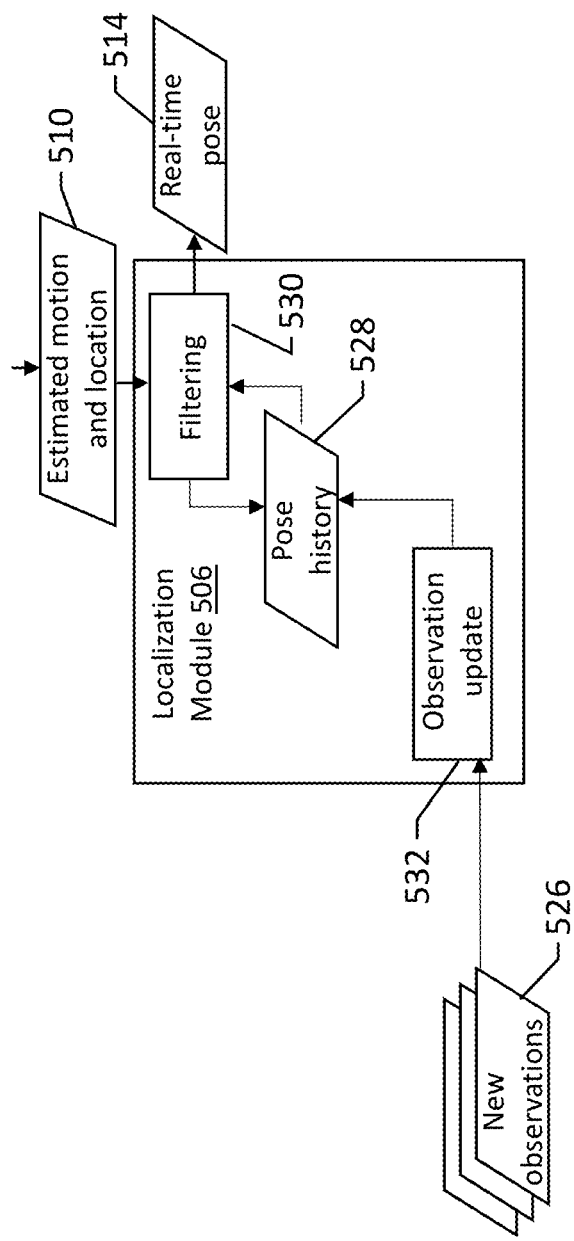
Figure 9:
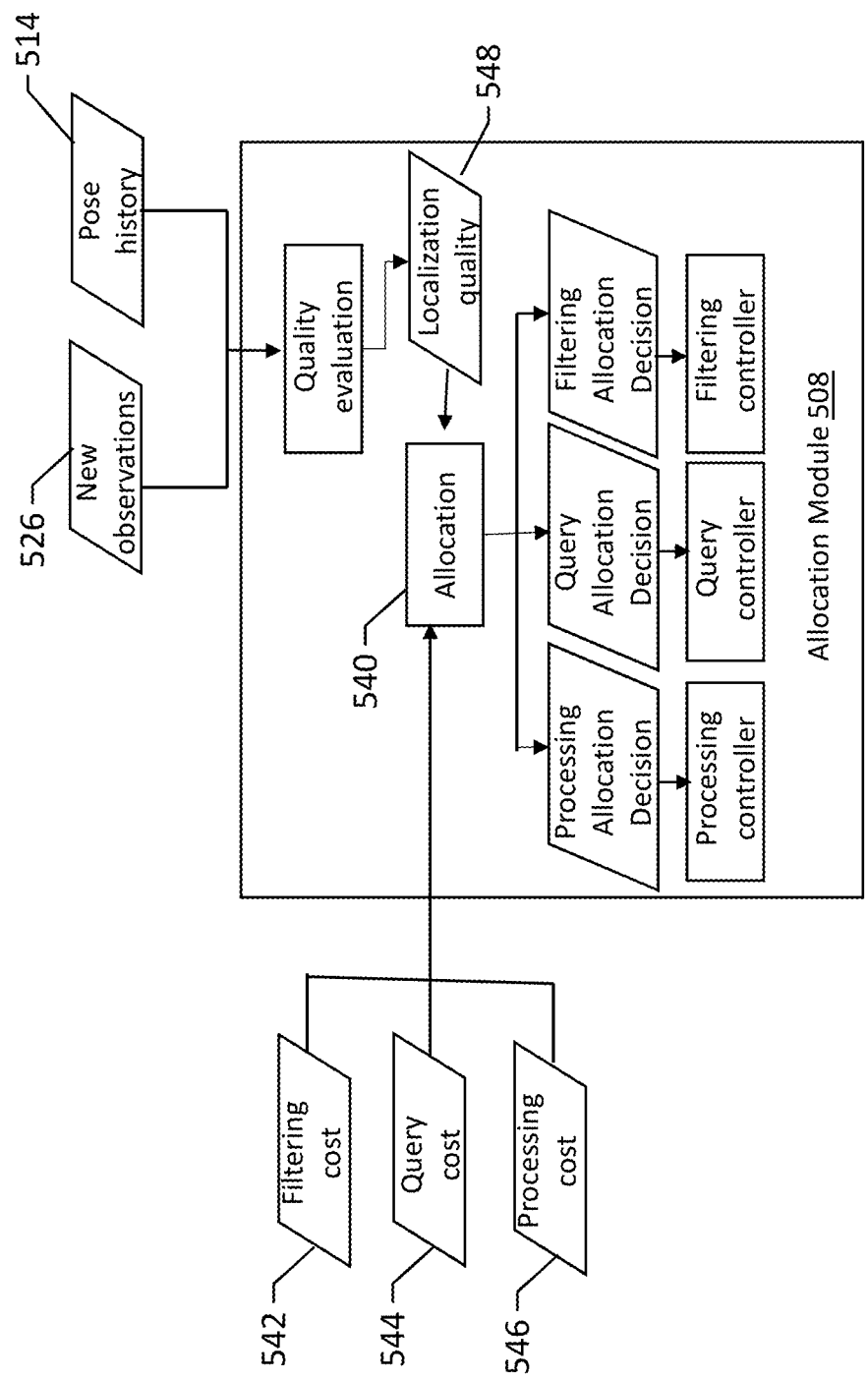
Figure 10:
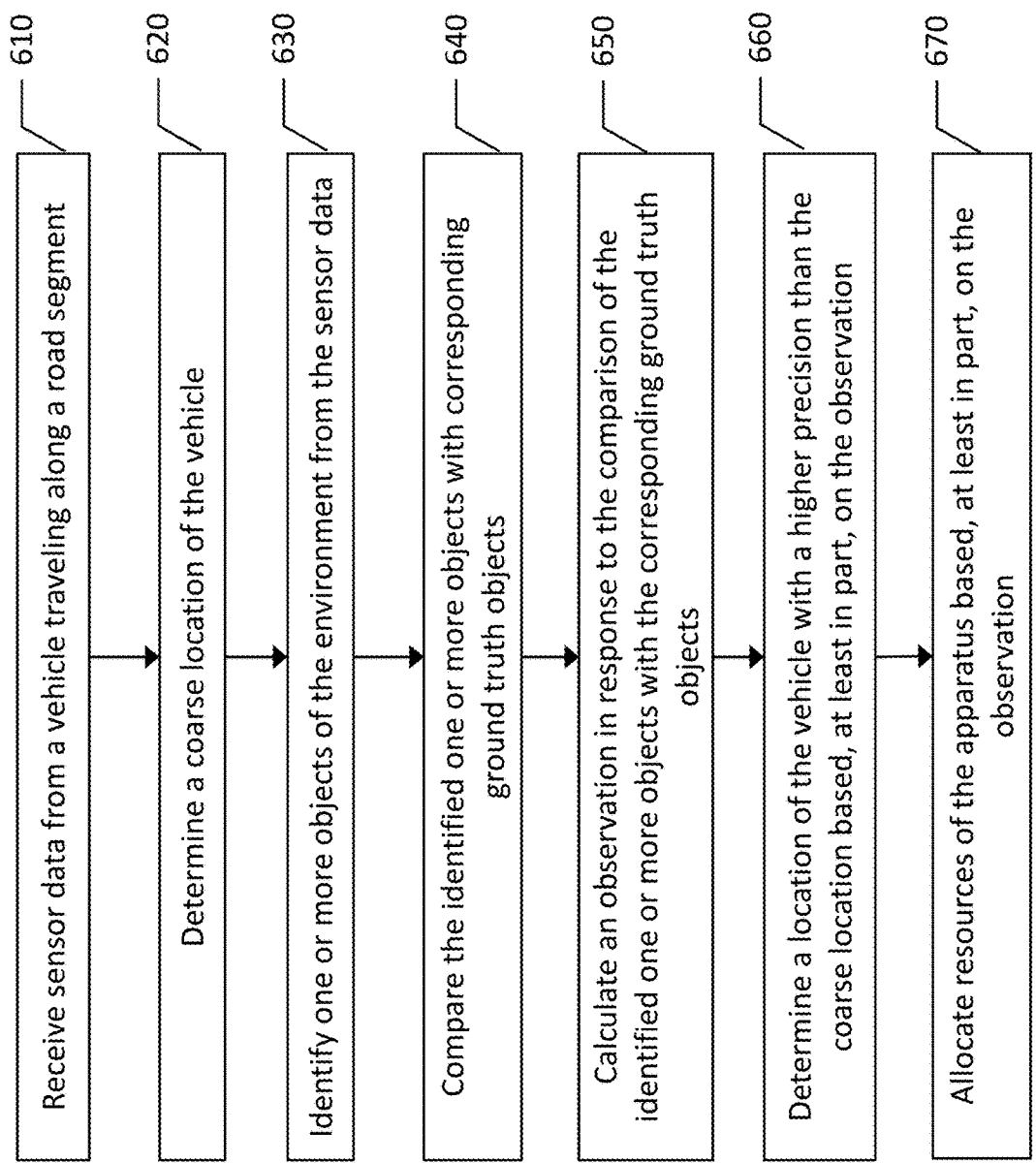

Having thus described certain example embodiments of the present disclosure in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for improving the efficiency of localization according to an example embodiment of the present disclosure;

FIG. 3 is a table of feature objects and their properties according to an example embodiment of the present disclosure;

FIG. 4 illustrates time intervals and timelines between different units including LiDAR, imagery, vehicle localization system, and estimated sequence (e.g., GPS and IMU) according to an example embodiment of the present disclosure;

FIG. 5 illustrates information delay from localization according to an example embodiment of the present disclosure;

FIG. 6 is a block diagram of a system for improving the efficiency of localization according to an example embodiment of the present disclosure;

FIG. 7 is a detail view of the object processing module of FIG. 6 according to an example embodiment of the present disclosure;

FIG. 8 is a detail view of the localization module of FIG. 6 according to an example embodiment of the present disclosure;

FIG. 9 is a detail view of the allocation module of FIG. 6 according to an example embodiment of the present disclosure; and FIG. 10 is a flowchart of operations for improving the efficiency of localization according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Real-time localization of a vehicle assists in achieving a high level of autonomous driving. Self-localization, in contrast to traditional localization, has more stringent requirements in time efficiency (real-time) and accuracy. However, self-localization also has unique limitations such as cost (e.g., sensor array cost), power supply and availability, communications bandwidth, etc. Further, rapidly changing environments may affect the accuracy and repeatability of self-localization. Environmental factors that may impact self-localization may include weather, traffic conditions, road quality, lighting, etc. The accuracy requirement for self-localization may be on the order of centimeters, such as within one to ten centimeters while the temporal efficiency to be considered as real-time may be as within tenths or hundredths of a second depending on vehicle speed and other dynamic conditions.

Traditional self-localization where an object, such as a vehicle or mobile device identifies its own location, may include GNSS-based (Global Navigation Satellite System) localization which offers accuracy of within one meter; however, the reliability and repeatability is susceptible to error. Multi-path interference, ionospheric delay, obstructions, and even satellite clock error/unsynchronization may be issues, particularly in urban environments with urban canyon effects. These issues render GNSS-based localization too coarse or inaccurate and unreliable to be relied upon exclusively for autonomous vehicle control. DGPS (differential global positioning system) localization techniques may offer accuracy down to centimeters; however, the localization process has substantial latency which fails to satisfy the time efficiency needs for autonomous vehicle control reliance.

Embodiments described herein to overcome the aforementioned deficiencies rely upon a combination of on-board sensors and high-definition (HD) maps. On-board sensors, such as cameras, LiDAR (light distancing and ranging) units, and/or Radar units, are used to provide distance measurements or observations of surrounding localization objects also referred to herein as landmarks. Observations include distance measurements between localization objects or landmarks and their corresponding ground truth objects or landmarks. HD maps otherwise known as feature maps offer the corresponding localization objects or landmarks pre-stored in a database as ground truth. By comparing (matching/associating) the detected and pre-stored landmarks, a vehicle or mobile device can establish an accurate location or become localized in the map coordinate frame. Localization objects or landmarks may include semantic objects such as road facilities, pole-like objects, curbs, signs, and traffic lights or non-semantic objects such as spatial voxels without any semantic meaning. However, conventional self-localization with onboard sensors may still include greater latency than permissible for fully autonomous driving.

Different localization objects or landmarks along with different acquisition and processing techniques are suitable for various external conditions (e.g., weather, traffic, etc.) and vehicle status, and have different computational costs and processing time (delay). These issues illustrate that there is no single solution that can handle all possible variables as an all-in-one solution to the self-localization problem. Hence, embodiments described herein provide a modularized localization framework that handles heterogeneous sensing data with consideration of various internal and external variables. Embodiments described herein provide reduced observation latency, external environment robustness, and internal optimization.

A method, apparatus and computer program product are provided in accordance with an example embodiment of the present invention for improving the efficiency of vision-based mapping and self-localization. Embodiments relate to localization which may benefit autonomous and semi-autonomous vehicle control, in addition to navigational assistance and route guidance as utilized in conjunction with manual vehicle control. Embodiments described herein implement a framework using modules that may be independently operable and replaceable. A decision module is provided to dynamically allocate and, in some embodiments, optimize the workload of each object processing unit to improve the efficiency of self-localization. As used herein, a module may be embodied by the processor 24, a combination of the processor and the memory device 26, or a computer program product executed by the processor to perform the function described herein in conjunction with the respective module.

FIG. 1 is a schematic diagram of an example apparatus configured for performing some of the operations described herein, such as using sensor data to identify objects in an environment and to correlate the identified objects with a high-definition map. Embodiments may further use a framework of modules for allocation of resources in self-localization as described further below. Apparatus 20 is an example embodiment that may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle with the assistance of establishing the vehicle location using a sensor-based mapping system according to example embodiments described herein. However, embodiments of the apparatus may be embodied or partially embodied as a mobile terminal, such as a personal digital assistant (PDA), mobile telephone, smart phone, personal navigation device, tablet computer, camera or any combination of the aforementioned systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS) sensor/antenna, accelerometer, image sensor, LiDAR (Light Distancing and Ranging) sensor, radar, and/or gyroscopic sensor. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as wirelessly, e.g., by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by near field communication, described above. Additionally or alternatively, the communication interface 22 may be configured to communicate wirelessly, such as over Global System for Mobile Communications (GSM) including, but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may optionally support wired communication or may alternatively support vehicle to vehicle or vehicle to infrastructure wireless links.

The apparatus 20 may support a mapping or navigation application so as to present maps or otherwise provide navigation, driver assistance, or some degree of autonomous control of a vehicle. For example, the apparatus 20 may provide for display of a map and/or instructions for following a route within a network of roads via user interface 28. In order to support a mapping application, the computing device may include or otherwise be in communication with a geographic database, which may be a map of a sensor-based localization system, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment of an apparatus for use in a sensor-based localization system, the map stored in memory 26 may include a database of geo-referenced images used to identify the location of a vehicle through sensor-based localization techniques. In an example in which the apparatus is embodied by a vehicle, the memory 26 may store a portion of a map database including only portions of the database that are within a predetermined geographic region relative to the vehicle such that latency may be minimized when establishing a location through analysis of the geo-referenced images or objects.

In example embodiments, a navigation system user interface, such as user interface 28, may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Having an accurate understanding of a location facilitates navigation assistance and autonomous or semi-autonomous vehicle control.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. Autonomous and semi-autonomous vehicle control may be performed in a variety of different ways. However, an understanding of the location of the vehicle facilitates use of any form of map-based vehicle control. While some degree of autonomy can be provided through visual identification of objects along a road by a vehicle traveling along the road, such vision-based autonomous control strategies may benefit from or rely upon proper location identification of the vehicle among the road network. For example, accurately identifying the location of a vehicle along a road segment may enable identification of roadway restrictions, such as a speed limit, but also provide an understanding of the road geometry which may be stored in the map database, such as in a High Definition (HD) map database. In such embodiments, sensors on the vehicle may be used to establish dynamic obstacles and other vehicles on the road segment, while an understanding of the environment may rely upon accurate identification of the vehicle on a road segment.

Autonomous and semi-autonomous vehicles may use HD maps to help navigate and to control a vehicle along its path. These HD maps may provide road geometry, lane geometry, landmarks or localization objects, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may provide cloud-based services and/or may operate via a hosting server that receives, processes, and provides data to other elements of the system.

The map data service provider may include a map database 110 that may include node data, road segment data or link data, point of interest (POI) data, traffic data, geo-referenced image data for vision-based locating, or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 110.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features and/or to facilitate autonomous or partial autonomous control of a vehicle. In such a case, the map database 110 can be downloaded or stored on the end user device which can access the map database 110 through a wireless or wired connection, such as via a processing server 102 and/or the network 112, for example. Such an embodiment may benefit vehicles using or relying on vision-based locating by storing or caching a portion of the database of geo-tagged images used for vision-based mapping on memory local to the vehicle in order to reduce or eliminate latency, which may be important during autonomous vehicle control that relies upon accurate location identification during operation.

As described above, the map database 110 of example embodiments may be generated from a plurality of different sources of data. Additional data may be stored in the map database such as traffic information, routing information, etc. This data may supplement the HD map data that provides an accurate depiction of a network of roads in the geographic region in a high level of detail including road geometries, localization objects along the roads such as signs, poles, curbs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, LiDAR, GPS, Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Embodiments described herein may broadly relate to using an on-board self-localizer (e.g., a localization framework) to assist a human driver and/or vehicle controller to navigate road conditions in real time. The HD maps described above have a high level of detail; however, the high level of detail is of limited value if a vehicle cannot be accurately located within the HD map as it travels along road segments within the map. Embodiments described herein provide a method of establishing a location of the vehicle in a more efficient manner using less processing capacity and reducing latency.

Embodiments described herein implement a framework including numerous modules that collaborate to process information and data to localize a vehicle to a centimeter-level of accuracy in real-time or near-real-time and in an efficient manner. Self-localization using only map-matching for object-based localization suffers from a low efficiency and low robustness of object extraction. Object extraction from either two-dimensions or three-dimensions, or a fusion of both is computationally intense and consumes substantial memory such that it is not robust in some circumstances. Object extraction with map matching alone is insufficient to handle vehicle real-time localization at high refresh rates.

To localize a vehicle or device equipped with three-dimensional data acquisition capability such as LiDAR, objects or localization objects are generally used. Localization objects include semantic objects that can be obtained commonly in daily driving scenarios such as pole-like structures, curbs, guardrails, signs, overpass structures, lane markings, and building surfaces or facades. These objects can be categorized based on their geometries (e.g., poles are discrete while curbs are continuous), distinction (e.g., repetitive such as lane lines or distinctive such as signs), ease/robustness of detection (e.g., signs may be difficult while lane lines are relatively easy), etc.

Embodiments of the present disclosure may select objects or object types for localization that satisfy certain requirements to improve localization. The properties of objects and classifications may include three primary aspects: detection, quantity and distribution, and physical properties. Objects that are easy to detect are preferable to reduce processing requirements and to improve robustness. Objects that are easy to detect both physically and algorithmically can be distinguished from the background or environment and from other objects. Dimensions of an easy-to-detect object should be large in at least one dimension and appear substantially similar from different angles. Algorithms employed herein are sufficiently mature from robustness, efficiency (both acquisition and processing speed) and costs (both hardware and software).

Localization objects are preferable if they have sufficient quantity and distribution. Ideally, localization objects are dense, discrete, and distinctive. The density of localization objects should be sufficient that they can be sensed by vehicles most anywhere at most anytime. The placement of such localization objects should be dense, but not necessarily evenly distributed. An even distribution of objects in any direction may result in matching issues such as lane markings extending continuously in a direction parallel to the road direction longitudinally, which can preclude accurate localization longitudinally along the road. Further, if a single object is unique and distinctive among its neighbors, the robustness of the localization system will be improved significantly. Physical properties of objects may be important as a long-term stable/durable object in shape and location is preferable to an object of a more dynamic shape or location. Localization objects in general should be time-invariant in shape and location such that they don't change over time. For example, lane markings and signs may deteriorate with traffic volume and inclement weather reducing service life to only a few years, while pole-like objects are generally robust and change little with time. The features acquired by corresponding types of sensors should be robust to weather. For instance, lane markings may become invisible from a LiDAR sensor during rain or snow.

Each type of localization object may suffer from some form of impermanence in that they do not appear consistent based on time of day, time of year, or over time. As such, embodiments described herein may actively select object types for localization to ensure that localization objects of the most reliable type are used as available. Several types of localization objects are described herein to include their strengths and weaknesses when used for localization.

Pole-like objects such as posts of traffic lights, signs, and lamps, utility poles, or even tree trunks may be used as localization objects. The advantages to pole-like objects include ease of detection. Pole-like objects are vertically elongated objects that can be obtained at different heights and angles, and are generally similar regardless of the angle of viewing. Algorithmically, pole detection approaches using three-dimensional sensors (e.g., LiDAR), native pole elevation, and pole geometry can provide efficient and robust pole detection. Poles may also have a desirable quantity and distribution. In an urban environment, poles may have a distribution of around ten meters longitudinally and 100-300 meters on a highway. Distribution in an urban area may be highly random while in a highway scenario poles may have a repetitive placement pattern. Physically, pole-like objects typically have a longer life span than lane markings or other objects. Utility poles may have life spans ranging from 30-60 years of service and they are generally not susceptible to obscuring by snow and rain due to their vertical orientation.

Using pole-like objects as landmarks or localization objects provides a reliable and repeatable self-localization estimate. The localization errors are generally low. However, processing time and acquisition sampling may be of concern. Using a 0.5-degree resolution rotating LiDAR to detect a ten centimeter diameter pole may have an effective range of only around 11 meters.

Curbs and lane markings are ubiquitous objects that can be used for localization. Curbs and lane marking share many features as both can offer an accurate lateral localization performance which is generally better than longitudinal localization. The detection of these objects may be easy due to their distinctive nature relative to a background or environment based on a reflectance/color for LiDAR or camera, and in shape. The algorithms for segmentation of lane markings and curbs are reliable. Further, lane markings and/or curbs can be obtained virtually everywhere while the vehicle drives on paved roads, which covers most autonomous driving scenarios.

Lane markings and curbs, however, have drawbacks for use in self-localization. Both lane markings and curbs are on or near the road surface level such that the objects can be occluded by vehicles and traffic. Inclement weather may also cause problems for the detection of lane markings and curbs. For instance, snow cover or rain may reduce visibility of lane markings for both LiDAR and cameras. Further, lane markings can deteriorate over time with wear and may become worn to the point of being undetectable.

Localization using signs has inherent drawbacks similar to those of painted lane markings. Although each single object may offer precise localization information, the distribution of this type of object may be clustered in certain areas. In an urban environment, the clustering leads to high-precision localization near intersections while between intersections a vehicle may use odometry based localization. Further, sign detection, especially using machine learning, is more expensive computationally from training (labeling) to detection compared to objects with simple geometry and greater density. Signs on a highway may be sparse while in urban environments signs may be much more dense. However, as signs often use vertical posts, the cost-benefit of developing independent sign modules for detection of signs increases. Two advantages of sign-based feature objects include the view range which is generally much higher than that of pole-like objects due to the dimensions of a sign, and each sign may be relatively unique locally, which makes local matching much easier and accurate for localization.

Other than semantic objects as described above, "pure" objects without classification and segmentation that may be represented in data points (unstructured data) or voxels (3D)/pixels (2D) (structured data) may be used for self-localization. To match the real-time acquisition to the on-board data, an Iterative-Closest-Point-like (ICP) approach may be used to provide an observation. This embodiment uses all data, which may be 3D point cloud from LiDAR sensors, acquired by the vehicle to match the voxel or the voxel within a predefined probability to a map. Localization using semantic objects is less computationally expensive and thus generally preferable. Semantic objects are generally represented in a mathematical model (e.g., axis-radius-length for poles, polyline-width for lane markings, etc.) and may be more efficient and repeatable than point cloud matching of unstructured data.

Embodiments described herein may select the object type used for localization based on the data available. For example, pole-like objects may be used for localization where they are readily available and distinctive locally. Further, pole-like objects may be desirable for self-localization during periods of heavy traffic, where lane lines, curbs, guard rails, and other low-elevation objects may be obscured by vehicle traffic, while pole-like objects may remain visible. Thus, as will be described further below, localization may focus more energy and resources (e.g., power consumption and processing capacity) to sensors detecting pole-like objects at a higher elevation than to sensors positioned to detect lane lines and curbs.

FIG. 3 is a table of different types of objects and their respective strengths or weaknesses. A "/" in a column entry distinguishes between urban/rural. As shown, pole objects are easily matched with strong reliability in weather. Lane markings are shown as providing latitude, but not longitude as the lane markings extend in the longitudinal direction of the vehicle. The usefulness of the various objects may be considered by embodiments described herein when establishing object types to dedicate processing capacity to.

As described above, various objects may be used for self-localization with different advantages and disadvantages to each type of object. In order to match or associate detected objects to objects from the feature map, three approaches may be employed. The most straightforward approach is the Nearest Neighbor matching which involves pairing a given point with another 'closest' point. One drawback to this method is if the estimated location error is larger than any adjacent localization objects, the matching result becomes uncertain and may become useless. A second approach is feature matching. In feature matching, for each single object, a unique 'descriptor' is built that describes the local relationship of this object for one-to-one matching. A drawback to this approach is that it is sensitive to precision and recall of object detection. The third approach is similar to the aforementioned ICP-like method which minimizes the sum of distances between each paired object from detection to the map. This type of method is sensitive to the number of objects. These varied map-matching methodologies may be used logically to maximize efficiency in both processing and temporally for real-time localization as described further below. Embodiments described herein may employ a preferred algorithm according to a current condition of a vehicle in an environment, where the preferred algorithm successfully matches detected objects to objects in the feature map with a relatively-high degree of accuracy and a relatively-low associated cost.

A key aspect of real-time self-localization is fast processing on a per-frame basis. A 100-millisecond delay may cause a shift of tens of centimeters to several meters when a vehicle is moving. FIG. 4 illustrates an example embodiment of different processing sequences and times for various localization means. A vehicle may require localization at a time interval of $\Delta t_{sys}$ (or distance interval if needed), starting from time t, depicted in FIG. 4. Estimated motion and location received from Global Positioning and/or an Inertial Measurement Unit (IMU), image sensor, and LiDAR sensor have acquisition speeds at $\Delta t_{gps}$, $\Delta t_{im}$, and $\Delta t_{pcl}$ respectively. These timestamps are not necessarily aligned. GPS and IMU provide basic motion and relatively coarse location information periodically. The acquisition and processing time are considered as negligible or substantially instant. Camera-like sensors acquire data at high shutter speed and need time $t_{ip}$ to process the data (e.g., to get an observation). LiDAR-like sensors, along with structure from motion or camera exposure in low light may require sampling time $t_{ps}$ to acquire data and another time $t_{pp}$ to provide an observation.

Theoretically, every type of data needs sampling/acquisition and processing time (e.g., extraction and matching) to return an observation, which may lead to several dozens of milliseconds to even seconds of delay, as the arrows 402 and 404 in FIG. 4 illustrate. The observations calculated from localization objects relative to ground truth objects may not be used in localization of the vehicle in true real-time direction (if the vehicle is moving, not stationary). These observations can only be used in pose history for filtering. True, real-time location as described herein requires the fusion of real-time estimated location corrected by filtering the pose history as illustrated in FIG. 5.

Embodiments provided herein include a framework that establishes self-localization while overcoming the deficiencies of the prior art. The framework described herein is modularized in such a way that the modules are hot-swappable and replaceable such that the system is able to handle any landmarks or feature objects without interacting with any other modules. Further, a decision module is used to dynamically allocate and, in some embodiments, optimize the workload of each localization object processing unit to ensure the system is more efficient in both processing and memory requirements.

The framework, an example of which is illustrated in FIG. 6, includes four primary modules: a database module 502, a landmark or localization object processing module 504, a localization module 506, and an allocation module 508. A sensor module may be implemented such as sensor(s) 21 of FIG. 1, and a filtering module may also be implemented to function conventionally. As shown in FIG. 6, localization module 506 receives the estimated motion and coarse location 510 from a sensor module, which may include GPS and IMU sensors to provide the estimated motion and location. The localization module 506, in combination with conventional map-matching enables provision of a link-level localization as real-time pose 514.

Raw sensed data 512 is received at the object processing module to produce object-to-object matching/alignment from two or three dimensions based on objects and landmarks from the database module 502. The object processing module 504 can handle different localization objects or landmarks from different sources, such as poles, lane markings, curbs, and signs from two- or three-dimensional imagery individually or collaboratively. Due to limits on hardware resources, such as processing capacity, memory, and communications bandwidth along with software constraints (e.g., latency) and system requirements (e.g., refresh rate and localization precision), an allocation module 508 is provided to allocate the modules used. The object processing module 504, localization module 506, and allocation module 508, are described in greater detail below.

The object processing module 504, shown in greater detail in FIG. 7, includes one or more independent modules. Each module uses a single source or a fusion of multiple sources' sensing data and providing a raw data stream at 512, which may be provided by an on-board camera, LiDAR unit, or other data acquisition devices or vehicle-to-vehicle communication devices to detect designated objects. Corresponding ground truth or reference objects may be queried from database module 502 and provided as reference objects at 522 that include ground truth locations. The object processing module 504 extracts objects from the raw sensing data through object extraction at 516, and identifies detected objects at 518. Object matching is performed at 524 through a comparison between the ground truth objects and the detected objects to generate an observation from each individual object processing module 504, where each observation is a distance measurement between an observed object and a ground truth object. A timestamp of the observation is included, and the observation is output at 526 that becomes an input to the localization module 506 and to the allocation module 508.

The localization module 506 is illustrated in greater detail in FIG. 8 where estimated motion and location information 510 from sensors such as GPS and IMU sensors to establish a coarse location, filtered with the previous motion-and-location and observation history to generate real-time location at 514. The real time location may be provided to an application layer for autonomous vehicle control, navigational assistance, map generation/healing, or the like. The filtering process at 530 may include filter-based approaches and graph-based approaches. Regardless of the type of filtering, the update process to form the pose history 528 is facilitates the efficiency (re-sampling) of the system and performance (weighting).

Each observation returned by the module has a non-negligible delay from the moment when data is captured until the observation is generated, which is defined as observation latency. Because of the observation latency, the location cannot be used as a "real-time" position when the vehicle is moving, particularly at higher speeds. In instances in which a vehicle is moving, the observation is used to provide error information of the estimated position and pose information for better real-time filtering based on localization performance and as the benchmark to evaluate each individual observation returned by the object processing module 504 provided at 532 to improve localization accuracy and to improve system allocation.

The allocation module, illustrated in detail in FIG. 9, is used to allocate hardware resources (e.g., processor capacity, memory capacity, communications bandwidth, etc.) to different object processing modules 504, the database module 502, and the localization module 506. The object processing module(s) typically consume the majority of resources in practice. Given limits on processing capacity, particularly on mobile devices or in-vehicle systems, it may not be possible to operate all modules at full power simultaneously. The cost-benefit of processing cost to localization performance of the system by example embodiments provided herein if the appropriate amount of processing capacity is appropriately allocated to the object processing module(s) that offer more valuable localization information. The allocation of 540 is performed based on the filtering cost 542, the query cost 544, and the processing cost 546 in view of the localization quality 548. While the filtering cost and the query cost may be relatively low compared with the processing cost, the filtering and query cost may remain relevant and may increase in importance when processing capacity is more readily available.

Self-localization for a vehicle employs a dataset of two primary datasets: an HD map dataset and a vehicle real-time acquisition dataset. The HD map, in this context, may contain every possible localization object (e.g., poles, lane markings, signs, etc.) in an appropriate model for semantic object-based localization, voxels for localization object study and ICP-like localization, and a standard definition (SD) map for reference. The vehicle real-time acquisition data set may include ground truth trajectory and estimated pose and motion (e.g., from GPS and IMU), while sensing data, such as LiDAR point clouds and image sequences may be used for corresponding localization object detection techniques. Timestamps should be associated with all data. Other datasets that may be considered include external parameter datasets such as road scenario (e.g., highway, urban, class of road, etc.), traffic conditions, and weather, to provide a comprehensive result.

Embodiments of the present disclosure use raw sensing data as an input to the object processing module 504 to detect objects within an environment based on reference objects from a database module 502. Based on the detected objects, an allocation module 508 determines which algorithms and objects to use for localization in order to maximize accuracy with a minimum processing cost.

According to an example embodiment, sensors of a vehicle may collect raw sensing data as input at 512 to the object processing module 504. The sensor data may include LiDAR data, image data, and various other types of data. The object processing module may perform pole-type object detection from the LiDAR sensor data, lane marking or lane line object detection from the LiDAR sensor data, pole-type object detection from the image data, and lane marking or lane line object detection from the image data, among various other object types and sensor data received. Using these four detection algorithms (pole-type object—LiDAR, lane line object—LiDAR, pole-type object—image, and lane line object—image), object detection may be performed at 518 where detected objects are matched at 524 to reference objects. Based on the matching, the observations are output at 526. The observations may be provided to the localization module 506, as shown in FIG. 8 for an observation update 532. Based on the pose history and the observation update, a real-time pose 514 may be established. The processing cost from the object processing module, the filtering cost and pose history may be provided to the allocation module 508 for evaluation. If the pole-type object detection from the image data is providing high quality object matching, the more costly and processing intensive LiDAR data may cease to be used for pole-type object detection as it is redundant and more costly. Similarly, if the object matching from image data on lane line objects is poor, but the object matching from LiDAR data on lane line objects is good, then lane line object detection from image data may be ceased while the LiDAR data may be used for lane line detection. The sensor data collected from different sensors may thus be pruned to collect only the data that will be used for localization.

This principle can evaluate the algorithms used for object detection and preclude the spending of resources such as processing capacity and power on poorly performing object detection algorithms. Periodically, all sensor data may be processed for object detection in order to ensure that the data used, and algorithms used are the most efficient and effective for self-localization of the vehicle.

Certain algorithms and sensor data may perform better in different environments and under different conditions. For example, lane line object detection in the rain may be difficult with images and more successful with LiDAR. Different combinations of sensor data and object detection algorithms may be more effective and efficient in different situations, such that models may be generated based on the conditions a vehicle is experiencing. These models may define the sensors and algorithms used based on determined conditions, and when those conditions are encountered, embodiments described herein may use the defined model to identify which sensors and algorithms are most effective. Periodic verification of the sensed data and algorithms used may be performed in order to ensure the most efficient and effective data and algorithms are in use; however, the models may provide a basis to reduce the iterations of different sensors, data, and algorithm combinations that are most efficient and effective.

FIG. 10 illustrates a flowchart depicting a method according to an example embodiment of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 10 is a flowchart of a method for localization of an apparatus or vehicle within a mapped region. Sensor data from an apparatus or vehicle traveling along a road segment is received at 610. A coarse location of the vehicle is established at 620, which may be determined through GPS, IMU, or other positioning sensors. One or more objects of the environment are identified from the sensor data at 630. The identified one or more objects are compared at 640 with corresponding ground truth objects. The ground truth objects may be determined from the coarse location and an HD map database. An observation is calculated at 650 in response to the comparison of the identified one or more objects with the corresponding ground truth objects. A location of the vehicle is determined at 660 having a higher precision than the coarse location based, at least in part, on the observation. At 670, resources of the apparatus are allocated based, at least in part, on the observation.

In an example embodiment, an apparatus for performing the method of FIG. 6 above may comprise a processor (e.g., the processor 24) configured to perform some or each of the operations (610-670) described above. The processor may, for example, be configured to perform the operations (610-670) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-670 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive sensor data from a vehicle traveling along a road segment, wherein the sensor data comprises first sensor data of discrete objects in an environment from a first sensor and second sensor data of continuous objects in the environment from a second sensor;
   determine a coarse location of the vehicle;
   identify one or more objects of the environment from the sensor data, wherein the one or more objects of the environment from the sensor data comprise at least one of one or more discrete objects from the first sensor data or one or more continuous objects from the second sensor data;
   compare the identified one or more discrete objects from the first sensor data and the identified one or more continuous objects from the second sensor data with corresponding ground truth objects;
   calculate an observation in response to the comparison of the identified one or more objects with the corresponding ground truth objects, wherein the calculated observation includes an accuracy of localization relative to the first sensor data of discrete objects in the environment and the second sensor data of continuous objects in the environment, wherein the calculated observation further includes an indication that the first sensor data has a relatively higher quality of object matching than the second sensor data;
   determine a location of the vehicle with a higher precision than the coarse location based, at least in part, on the calculated observation; and
   allocate resources of the apparatus based, at least in part, on the calculated observation, wherein causing the apparatus to allocate resources comprises causing the apparatus to prioritize the first sensor data from the first sensor over the second sensor data from the second sensor based, at least in part, on the calculated observation.

2. The apparatus of claim 1, wherein causing the apparatus to identify one or more objects of the environment from the sensor data comprises causing the apparatus to:
   using a first algorithm of a first module, identify one or more pole objects in the environment from the first sensor data; and
   using a second algorithm of a second module, identify one or more lane line objects in the environment from the second sensor data.

3. The apparatus of claim 2, wherein causing the apparatus to compare the identified one or more pole objects from the first sensor data and the identified one or more lane line objects from the second sensor data with corresponding ground truth objects comprises causing the apparatus to:
   compare the identified one or more pole objects in the environment with corresponding ground truth pole objects; and
   compare the identified one or more lane line objects in the environment with corresponding ground truth lane line objects.

4. The apparatus of claim 3, wherein causing the apparatus to calculate the observation in response to the comparison of the identified one or more pole objects from the first sensor data and the identified one or more lane line objects from the second sensor data with the corresponding ground truth objects comprises causing the apparatus to:
   calculate a first observation in response to the comparison of the identified one or more pole objects in the environment with the corresponding ground truth pole objects; and
   calculate a second observation in response to the comparison of the identified one or more lane line objects in the environment with corresponding ground truth lane line objects.

5. The apparatus of claim 4, wherein causing the apparatus to allocate resources of the apparatus based, at least in part, on the observation further comprises causing the apparatus to:
- analyze resource consumption of the first module and the second module; and
- allocate proportionally more resources to at least one of the first module or the second module in response to the analysis of resource consumption.

6. The apparatus of claim 4, wherein causing the apparatus to allocate resources of the apparatus based, at least in part, on the observation comprises causing the apparatus to:
- identify a model based, at least in part, on the calculated first observation and the calculated second observation; and
- allocate resources according to the identified model.

7. The apparatus of claim 2, wherein the apparatus is further caused to:
- receive sensor data from at least one of a global positioning system (GPS) or inertial measurement unit (IMU); and
- identify, at a third module, the coarse location based on the sensor data from the at least one of the GPS or IMU;
- wherein causing the apparatus to allocate resources of the apparatus based, at least in part, on the observation further comprises causing the apparatus to allocate proportionally more resources to the first module, the second module, or the third module based, at least in part, on the observation and the coarse location identified at the third module.

8. A computer program product comprising at least one non-transitory computer-readable storage medium having computer-executable program code instructions stored therein, the computer-executable program code instructions comprising program code instructions to:
- receive sensor data from a vehicle traveling along a road segment, wherein the sensor data comprises first sensor data of one or more discrete objects in an environment from a first sensor and second sensor data of one or more continuous objects in the environment from a second sensor;
- determine a coarse location for the vehicle;
- identify one or more objects of the environment from the sensor data, wherein the one or more objects of the environment from the sensor data comprises at least one of one or more discrete objects from the first sensor data or one or more continuous objects from the second sensor data;
- compare the identified one or more discrete objects from the first sensor data and the identified one or more continuous objects from the second sensor data with corresponding ground truth objects;
- calculate an observation in response to the comparison of the identified one or more objects with the corresponding ground truth objects, wherein the calculated observation includes an accuracy of localization relative to the first sensor data of discrete objects in the environment and the second sensor data of continuous objects in the environment, wherein the calculated observation further includes an indication that the first sensor data has a relatively higher quality of object matching than the second sensor data;
- determine a location of the vehicle with a higher precision than the coarse location based, at least in part, on the calculated observation; and
- allocate resources of the apparatus based, at least in part, on the calculated observation, wherein causing the apparatus to allocate resources comprises causing the apparatus to prioritize the first sensor data from the first sensor over the second sensor data from the second sensor based, at least in part, on the calculated observation.

9. The computer program product of claim 8, wherein the program code instructions to identify one or more objects of the environment from the sensor data comprise program code instructions to:
- using a first algorithm of a first module, identify one or more pole objects in the environment from the first sensor data; and
- using a second algorithm of a second module, identify one or more lane line objects in the environment from the second sensor data.

10. The computer program product of claim 9, wherein the program code instructions to compare the identified one or more pole objects from the first sensor data and the identified one or more lane line objects from the second sensor data with corresponding ground truth objects comprise program code instructions to:
- compare the identified one or more pole objects in the environment with corresponding ground truth pole objects; and
- compare the identified one or more lane line objects in the environment with corresponding ground truth lane line objects.

11. The computer program product of claim 10, wherein the program code instructions to calculate the observation in response to the comparison of the identified one or more pole objects from the first sensor data and the identified one or more lane line objects from the second sensor data with the corresponding ground truth object comprises program code instructions to:
- calculate a first observation in response to the comparison of the one or more pole objects in the environment with the corresponding ground truth pole objects; and
- calculate a second observation in response to the comparison of the one or more lane line objects in the environment with corresponding ground truth lane line objects.

12. The computer program product of claim 11, wherein the program code instructions to allocate resources of the apparatus based, at least in part, on the observation further comprises program code instructions to:
- analyze resource consumption of the first module and the second module; and
- allocate proportionally more resources to at least one of the first module or the second module in response to the analysis of resource consumption.

13. The computer program product of claim 11, wherein the program code instructions to allocate resources of the apparatus based, at least in part, on the observation comprise program code instructions to:
- identify a model based, at least in part, on the calculated first observation and the calculated second observation; and
- allocate resources according to the identified model.

14. The computer program product of claim 9, further comprising program code instructions to:
- receive sensor data from at least one of a global positioning system (GPS) or inertial measurement unit (IMU); and
- identify, at a third module, the coarse location based on the sensor data from the at least one of the GPS or IMU;
- wherein the program code instructions to allocate resources of the apparatus based, at least in part, on the observation further comprises program code instructions to allocate proportionally more resources to the first module, the second module, or the third module based, at least in part, on the observation and the coarse location identified at the third module.

15. A method comprising:
receiving sensor data from a vehicle traveling along a road segment, wherein the sensor data comprises first sensor data of one or more discrete objects in an environment from a first sensor and second sensor data of one or more continuous objects in the environment from a second sensor;
identifying one or more objects of the environment from the sensor data, wherein the one or more objects of the environment from the sensor data comprises at least one of one or more discrete objects from the first sensor data or one or more continuous objects from the second sensor data;
determining a coarse location of the vehicle;
comparing the identified one or more discrete objects from the first sensor data and the identified one or more continuous objects from the second sensor data with corresponding ground truth objects;
calculating an observation in response to the comparison of the identified one or more objects with the corresponding ground truth objects, wherein the calculated observation includes an accuracy of localization relative to the first sensor data of discrete objects in the environment and the second sensor data of continuous objects in the environment, wherein the calculated observation further includes an indication that the first sensor data has a relatively higher quality of object matching than the second sensor data;
determining a location of the vehicle with a higher precision than the coarse location based, at least in part, on the calculated observation; and
allocating resources of the apparatus based, at least in part, on the calculated observation, wherein causing the apparatus to allocate resources comprises causing the apparatus to prioritize the first sensor data from the first sensor over the second sensor data from the second sensor based, at least in part, on the calculated observation.

16. The method of claim 15, wherein identifying one or more objects of the environment from the sensor data comprises:

using a first algorithm of a first module, identifying one or more pole objects in the environment from the first sensor data; and
using a second algorithm of a second module, identifying one or more lane line objects in the environment from the second sensor data.

17. The method of claim 16, wherein comparing the identified one or more pole objects from the first sensor data and the identified one or more lane line objects from the second sensor data with corresponding ground truth objects comprises:
comparing the identified one or more pole objects in the environment with corresponding ground truth pole objects; and
comparing the identified one or more lane line objects in the environment with corresponding ground truth lane line objects.

18. The method of claim 17, wherein calculating the observation in response to the comparison of the identified one or more pole objects from the first sensor data and the identified one or more lane line objects from the second sensor data with the corresponding ground truth objects comprises:
calculating a first observation in response to the comparison of the one or more pole objects in the environment with the corresponding ground truth pole objects; and
calculating a second observation in response to the comparison of the one or more lane line objects in the environment with corresponding ground truth lane line objects.

19. The apparatus of claim 1, wherein causing the apparatus to allocate resources comprises causing the apparatus to allocate relatively more of at least one of processor capacity, memory capacity, or communications bandwidth to the first sensor data from the first sensor over the second sensor data from the second sensor based, at least in part, on the observation.

20. The apparatus of claim 1, wherein the first sensor is a first sensor type selected from the group of an image sensor and a Light Detection and Ranging (LiDAR) sensor, wherein the second sensor is a second sensor type selected from the group of an image sensor and a Light Detection and Ranging (LiDAR) sensor, and wherein the first sensor type is different from the second sensor type.

* * * * *